(12) United States Patent
Keller et al.

(10) Patent No.: US 10,174,828 B2
(45) Date of Patent: Jan. 8, 2019

(54) TRANSMISSION HOUSING FOR A TRANSMISSION, TRANSMISSION FOR AN ELECTRIC VEHICLE AND METHOD FOR PRODUCING A TRANSMISSION

(71) Applicant: BorgWarner Inc., Auburn Hills, MI (US)

(72) Inventors: Robert Francis Keller, Chesterfield, MI (US); Michael Schwekutsch, Eschelbronn (DE)

(73) Assignee: BorgWarner Inc., Auburn Hills, MI (US)

( * ) Notice: Subject to any disclaimer, the term of this patent is extended or adjusted under 35 U.S.C. 154(b) by 83 days.

(21) Appl. No.: 15/345,897

(22) Filed: Nov. 8, 2016

(65) Prior Publication Data

US 2017/0138448 A1    May 18, 2017

Related U.S. Application Data

(60) Provisional application No. 62/255,057, filed on Nov. 13, 2015.

(51) Int. Cl.
| | |
|---|---|
| *F16H 57/03* | (2012.01) |
| *F16H 3/72* | (2006.01) |
| *F16H 57/035* | (2012.01) |
| *F16H 57/033* | (2012.01) |
| *F16H 3/54* | (2006.01) |
| *F16H 1/28* | (2006.01) |
| *F16H 3/091* | (2006.01) |
| *F16H 57/02* | (2012.01) |

(52) U.S. Cl.
CPC ......... *F16H 57/035* (2013.01); *F16H 57/033* (2013.01); *F16H 1/28* (2013.01); *F16H 3/0915* (2013.01); *F16H 3/54* (2013.01); *F16H 2057/02043* (2013.01); *F16H 2200/0021* (2013.01); *F16H 2200/0034* (2013.01); *F16H 2200/0039* (2013.01); *F16H 2200/2005* (2013.01); *F16H 2200/2035* (2013.01)

(58) Field of Classification Search
CPC ................... F16H 2200/00–2200/2097; F16H 7/00–2007/0842; F16H 57/035; F16H 37/02; F16H 37/0813; F16H 3/091; F16H 1/28; F16H 3/006; F16H 3/54
See application file for complete search history.

(56) References Cited

U.S. PATENT DOCUMENTS

| 4,607,601 A * | 8/1986 | Kohler ...................... F01L 1/02 123/195 C |
| 2006/0276289 A1* | 12/2006 | Hirata ................... B60K 6/365 475/5 |
| 2013/0065721 A1* | 3/2013 | Kluge ...................... F16H 7/16 475/149 |

(Continued)

*Primary Examiner* — Ramya P Burgess
*Assistant Examiner* — Lillian T Nguyen
(74) *Attorney, Agent, or Firm* — BrooksGroup

(57) ABSTRACT

A number of variations may include a transmission housing for a transmission with a flexible drive having a housing section with at least one curved wall surface (70; 74; 80) facing an accommodation space for a wheel of the flexible drive, wherein the wall surface can be changed in a radial direction, thereby offsetting and/or enlarging the accommodation space. A number of variations may include a transmission and to a method for producing transmissions.

13 Claims, 6 Drawing Sheets

(56) References Cited

U.S. PATENT DOCUMENTS

Figure 1:
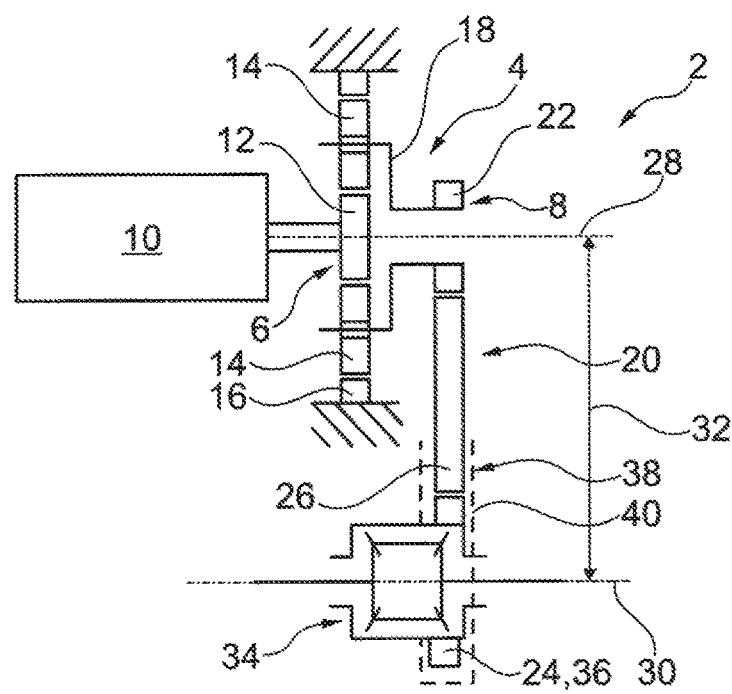

| | | | | |
|---|---|---|---|---|
| 2013/0130857 A1* | 5/2013 | Gassmann | ............... | B60K 1/00 |
| | | | | 475/150 |
| 2013/0190124 A1* | 7/2013 | Gassmann | ............... | B60K 1/00 |
| | | | | 475/150 |
| 2015/0377341 A1* | 12/2015 | Renner | ............... | F16H 57/0489 |
| | | | | 474/93 |

* cited by examiner

(12) United States Patent

US 10,174,828 B2

TRANSMISSION HOUSING FOR A TRANSMISSION, TRANSMISSION FOR AN ELECTRIC VEHICLE AND METHOD FOR PRODUCING A TRANSMISSION

CROSS-REFERENCE TO RELATED APPLICATIONS

This application claims the benefit of U.S. Provisional Application No. 62/255,057 filed Nov. 13, 2015.

DESCRIPTION

The present invention relates to a transmission housing for a transmission with a flexible drive having a housing section with at least one curved wall surface facing an accommodation space for a wheel of the flexible drive. Moreover, the present invention relates to a transmission for an electric vehicle. In addition, the present invention relates to a method for producing transmissions having a transmission housing of this kind.

Transmissions which have a flexible drive, that is to say, for example, a chain drive, are known in practice. In general, the flexible drive comprises an input-side wheel and an output-side wheel, wherein the input-side wheel and the output-side wheel are in rotary driving connection with one another via a flexible drive means of the flexible drive. In this arrangement, the flexible drive is arranged within a wet space, that is to say, for example, an oil space, of a transmission housing. The transmission housing has a housing section with an accommodation space for the output-side wheel of the flexible drive. Inter alia, this housing section has a curved wall surface facing the accommodation space, wherein the wall surface at least partially delimits the accommodation space in a radial direction. Here, the curvature of the wall surface is chosen so that it substantially matches the outer circumference of the output-side wheel of the flexible drive, with the result that there is a small clearance in the radial direction between the output-side wheel and the correspondingly curved wall surface, said clearance being substantially uniform along the wall surface. This relatively narrow free space between the output-side wheel, on the one hand, and the curved wall surface, on the other hand, has the advantage that the oil within the free space can be moved or delivered in a particularly effective manner through the rotation of the output-side wheel, this being advantageous particularly when the input-side wheel of the flexible drive is arranged above the output-side wheel of the flexible drive in the vertical direction, especially since the oil in the lower region of the transmission housing can thereby be delivered back upward in the direction of the input-side wheel of the flexible drive in order to reliably lubricate and/or cool the latter. Depending on the use, the center distance between the input-side wheel and the output-side wheel and/or the transmission ratio of the flexible drive varies in the known transmissions, this being brought about, for example, by means of a different outer circumference of the output-side wheel and/or a different number of teeth on the output-side wheel. Since a variation in the center distance between the input-side wheel and the output-side wheel or a variation in the outer circumference or diameter of the output-side wheel is subject to narrow limits owing to the predetermined curved wall surface facing the accommodation space for the output-side wheel of the flexible drive, it is also always necessary, in the case of different center distances and/or different transmission ratios of the flexible drive, to provide a transmission housing specifically designed for this use in order to ensure the desired small free space between the output-side wheel of the flexible drive, on the one hand, and the curved wall surface facing the accommodation space for said wheel, on the other, said small free space assisting the delivery of the oil within the transmission housing. Particularly in the case of small production numbers of a transmission of this kind, this means that a special transmission housing matched to the respective use has to be produced for each different center distance between the input-side wheel and the output-side wheel of the flexible drive and/or for each different transmission ratio of the flexible drive, and therefore the outlay on production is increased. This effect is particularly pronounced in the case of transmissions for electric motors, in particular, since they are produced only in relatively small numbers for the respective use.

It is therefore an object of the present invention to provide a transmission housing for a transmission with a flexible drive which can be used in a particularly flexible manner for flexible drives with different center distances between the input-side wheel and the output-side wheel and/or with different transmission ratios in order to reduce the outlay on production. Moreover, it is the underlying object of the present invention to provide an advantageous transmission for an electric vehicle. Moreover, it is the underlying object of the present invention to specify a method for producing transmissions having a transmission housing.

This object is achieved by means of the features indicated in the independent claims respectively. Advantageous embodiments of the invention form the subject matter of the dependent claims.

The transmission housing is designed for a transmission having a flexible drive. Thus, the transmission housing has a housing section with at least one curved wall surface facing an accommodation space for a wheel of the flexible drive. The curved wall surface preferably faces the accommodation space in a radially inward direction and/or is of substantially concave design. The wall surface can be changed in a radial direction, being offset or removed for example, thereby offsetting and/or enlarging the accommodation space. Since the wall surface can be changed in a radial direction, thereby offsetting and/or enlarging the accommodation space for the wheel of the flexible drive, the transmission housing can be used for different transmissions having a flexible drive. If the wall surface is changed in a radial direction, thereby offsetting the accommodation space, for example, the transmission housing is also suitable for flexible drives which have a shorter or longer center distance between an input-side wheel and an output-side wheel of a flexible drive. If, on the other hand, the accommodation space is enlarged in a radial direction by changing the wall surface, a correspondingly larger wheel can be accommodated in the accommodation space, this having an effect on the transmission ratio of the flexible drive. In other words, a transmission housing which is equally useful for flexible drives with different transmission ratios is thereby provided. This also includes embodiments in which changing the wall surface can result both in movement and enlargement of the accommodation space in a radial direction, and therefore a transmission housing which is equally useful for flexible drives which have both a different center distance between the input-side wheel and the output-side wheel and a different transmission ratio is thereby provided.

In another embodiment of the transmission housing, the housing section has a first wall with a curved first wall surface facing the accommodation space. The curved first wall surface facing the accommodation space preferably faces the accommodation space in a radially inward direction. In this embodiment, it is furthermore preferred if the first wall can be removed or offset, thereby offsetting and/or enlarging the accommodation space. If, for example, the first wall is removed, a wall which follows it can assume the task of delimiting a gap between the wheel to be accommodated in the accommodation space and the wall surface. If, on the other hand, the first wall is designed to be capable of being offset, it can be offset along the transmission housing section in such a way that an offset and/or enlarged accommodation space is formed, wherein the gap to be produced for the purpose of optimizing oil delivery within the transmission housing can furthermore be formed between the wheel to be arranged within the offset and/or enlarged accommodation space and the first wall surface of the first wall. In the case of the last-mentioned variant embodiments, in which the first wall is supposed to be capable of being offset, thereby offsetting and/or enlarging the accommodation space, the first wall is preferably of detachable design or arranged detachably on the housing section. However, this can also apply equally to a first wall which can be removed, thereby offsetting and/or enlarging the accommodation space.

In another embodiment of the transmission housing, the housing section furthermore has a second wall, which is spaced apart in a radially outward direction from the first wall and has a curved second wall surface facing the accommodation space, wherein the curved second wall surface preferably faces the accommodation space in a radially inward direction. If the abovementioned first wall is to be removed together with the first wall surface, the second wall surface of the second wall assumes the function of forming the oil delivery gap already mentioned between the wheel of the flexible drive which is to be accommodated in the accommodation space and the second wall surface.

In another embodiment of the transmission housing, the housing section furthermore has a third wall, which is spaced apart in a radially outward direction from the second wall and has a curved third wall surface facing the accommodation space, wherein the curved third wall surface once again preferably faces the accommodation space in a radially inward direction. In this case, the first and second walls are designed in such a way that they can be removed, if appropriate detached, thereby offsetting and/or enlarging the accommodation space, with the result that the third wall surface on the third wall then delimits the offset and/or enlarged accommodation space and the transmission housing can also be used for flexible drives which have a larger center distance between the input-side wheel and the output-side wheel of the flexible drive and/or a larger output-side wheel, which affects the transmission ratio.

Even if only a first, second and third wall with corresponding wall surfaces have been described above, it is self-evident that further such walls with a curved wall surface facing the accommodation space can be provided, each being arranged spaced apart in a radially outward direction from the previous wall in order to provide a transmission housing which can be used in a particularly flexible manner, and therefore to implement a transmission housing which can be used for flexible drives with significantly different center distances and/or transmission ratios. It has proven advantageous here if, in addition to the first, second and third walls, one to four further walls of this kind with corresponding curved wall surfaces facing the accommodation space are provided.

In principle, the curvature of the respective wall surface should be substantially matched to the curvature or the outer circumference of the wheel of the flexible drive to be accommodated in the accommodation space in order to achieve within the transmission a clearance between the outer circumference of the wheel of the flexible drive and the corresponding wall surface which is largely uniform over the length of the respective wall surface. In another embodiment of the transmission housing, at least one of the wall surfaces is therefore curved in the form of an arc, preferably in the form of a circular arc. In this case, it has proven advantageous if at least two or more or all of the available wall surfaces which face the accommodation space are curved in the form of an arc or of a circular arc.

In another embodiment of the transmission housing, at least two of the wall surfaces curved in the form of a circular arc, preferably more than two or all of the wall surfaces curved in the form of a circular arc, have the same circular arc radius. This embodiment is suitable particularly for transmissions, the flexible drives of which have different center distances between the input-side wheel and the output-side wheel but the same transmission ratio, eliminating the need to change the outer circumference of the wheel of the flexible drive which is to be accommodated in the accommodation space.

In another embodiment of the transmission housing, at least two of the wall surfaces curved in the form of a circular arc, preferably more than two or all of the wall surfaces curved in the form of a circular arc, have different circular arc radii. A transmission housing of this kind is suitable particularly for use in transmissions which have different transmission ratios owing to different sizes of the wheel to be accommodated in the accommodation space, but have the same center distance between the input-side wheel and the output-side wheel of the flexible drive.

In order to achieve good oil delivery and distribution within the transmission housing, at least one of the curved wall surfaces has a wraparound angle of at least 90°, preferably at least 120°, particularly preferably at least 140°, in relation to the accommodation space in another embodiment of the transmission housing.

In another embodiment of the transmission housing, the housing section, if appropriate the entire transmission housing, is designed as a casting or a diecasting, wherein the casting or diecasting can also be made up of a plurality of individually cast or diecast parts. In this embodiment, it is preferred if the first wall and, if appropriate, also the second wall is designed as a projecting rib. Moreover, it is preferred in this embodiment if the rib thickness is at least 3 mm and/or at most 10 mm in order, on the one hand, to achieve lightweight construction of the housing section and sufficient stability of the wall formed in each case as a projecting rib and, on the other hand, to allow simple removal of or offsetting of the first wall and, if appropriate, also of the second wall. Moreover, limiting the rib thickness to a maximum of 10 mm is advantageous especially for a variant embodiment in which the rib is formed integrally with another boundary wall and is supposed to be removed by a process involving removal or machining of material, e.g. by milling, for the purpose of offsetting and/or enlarging the accommodation space.

In another embodiment of the transmission housing, the housing section has at least one boundary wall delimiting the accommodation space in an axial direction. It is preferred here if the first wall and, if appropriate, also the second wall and/or third wall is/are at least of partially integral design with the boundary wall. Thus, the first wall and, if appropriate, also the second wall can first of all be produced as part of the production of the housing section and then—if required—taken away by removing or machining material so as to offset and/or enlarge the accommodation space in a radial direction.

In another embodiment of the transmission housing, at least one depression is provided in that side of the above-mentioned boundary wall which faces away from the accommodation space in the region of the first wall and, if appropriate, also in the region of the second and/or third wall. The depression simplifies the subsequent provision of fastening means in the region of the wall which is ultimately supposed to form or does form the boundary of the accommodation space. This is advantageous particularly if the housing section has two boundary walls, each delimiting the accommodation space in one axial direction and situated opposite one another in the axial direction, which are supposed to be fixed on one another in the axial direction, e.g. by means of a screwed joint.

The transmission for an electric vehicle has a single-, two-, three- or multi-speed transmission section, which has an input side assigned to at least one electric motor and an output side, which is in rotary driving connection with a wheel of a flexible drive via a flexible drive means of the flexible drive. The flexible drive is preferably a chain drive, and therefore the flexible drive means is designed as a chain and the wheel is designed as a chain wheel or sprocket. The transmission has the advantage that the center distance between the output side of the single-, two-, three- or multi-speed transmission section and the wheel of the flexible drive can be adapted to the respective use without major effort. Moreover, there is the advantage that the transmission ratio of the flexible drive can also be adapted relatively simply by correspondingly changing the size of the wheel.

In another embodiment of the transmission, the two-, three- or multi-speed transmission section has a planetary transmission.

In another embodiment of the transmission, the input side of the transmission section is formed by a sun wheel or annulus of the planetary transmission. As an alternative or in addition, the output side of the transmission section is formed by a planet carrier of the planetary transmission.

In another embodiment of the transmission, at least one selectively actuable clutch and/or brake is provided for shifting the transmission section between two or more speeds, wherein two or more selectively actuable clutches and/or brakes are preferably provided for shifting the transmission section.

In another embodiment of the transmission, the input side is assigned two electric motors. The two electric motors can each preferably be operated in the low voltage range and/or are designed as low-voltage motors. In this context, an electric motor that can be operated in the low voltage range or low-voltage motor is preferably taken to mean an electric motor which can be operated or is operated at a voltage of less than 60 volts.

In another embodiment of the transmission, the transmission furthermore has a differential, the input side of which is preferably formed by the wheel of the flexible drive, which is particularly preferably arranged in the accommodation space of the transmission housing.

In another embodiment of the transmission, the transmission has a transmission housing of the type described above, wherein the wheel of the flexible drive is arranged in the transmission housing, to be more precise in the above-described accommodation space of the transmission housing. This embodiment has the advantage that the transmission or the transmission housing thereof is relatively simple to produce from the above-described transmission housing according to the invention, while other transmissions with different center distances and/or transmission ratios can also be produced from this transmission housing. Consequently, a relatively low outlay on production is associated therewith, while high flexibility is obtained.

In another embodiment of the transmission, the first wall of the transmission housing and, if appropriate, also the second wall of the transmission housing is/are removed in a radial direction, thereby offsetting and/or enlarging the accommodation space. Here, the removal of the first and, if appropriate, also of the second wall is preferably accomplished by removal or machining of material, if appropriate by milling.

The method is used to produce transmissions, in particular transmissions of the above-described type according to the invention and has the method steps stated below. Thus, first of all, a quantity of transmission housings of the above-described type according to the invention is produced. Then, first transmissions are produced from a first partial quantity of the transmission housings by arranging the wheel of a flexible drive within the accommodation space. As an alternative or in addition, second transmissions, preferably having a flexible drive which has a different center distance and/or a different transmission ratio from the flexible drive of the first transmissions, are produced from a second partial quantity of the transmission housings by removing or offsetting the first wall and, if appropriate, also removing the second wall, thereby offsetting and/or enlarging the accommodation space in a radial direction and arranging the wheel of a flexible drive within the offset and/or enlarged accommodation space. The outlay on production is thereby reduced.

In one embodiment of the method, the method step of producing a quantity of transmission housings is performed by casting or diecasting.

Figure 2:
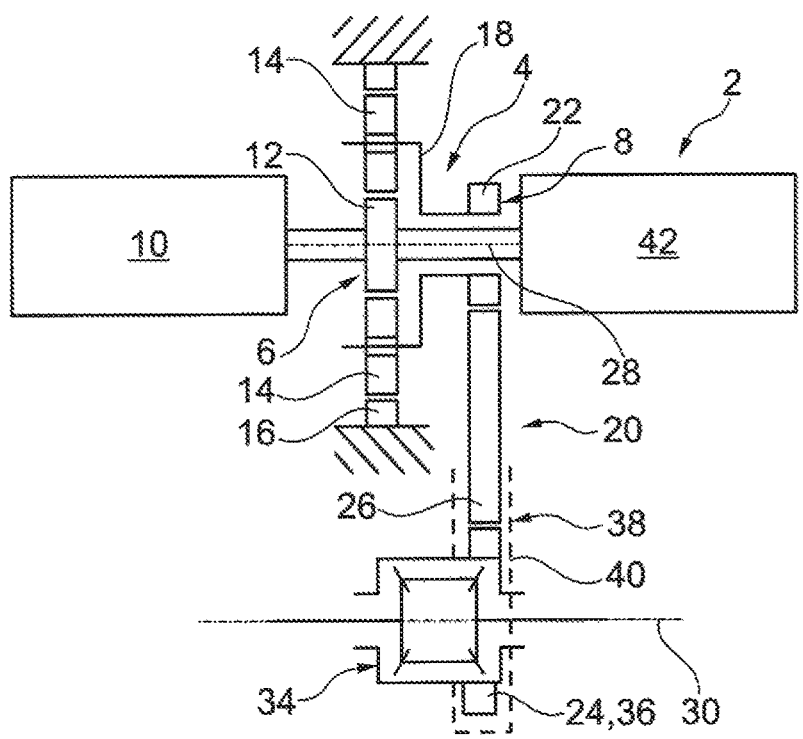
Figure 3:
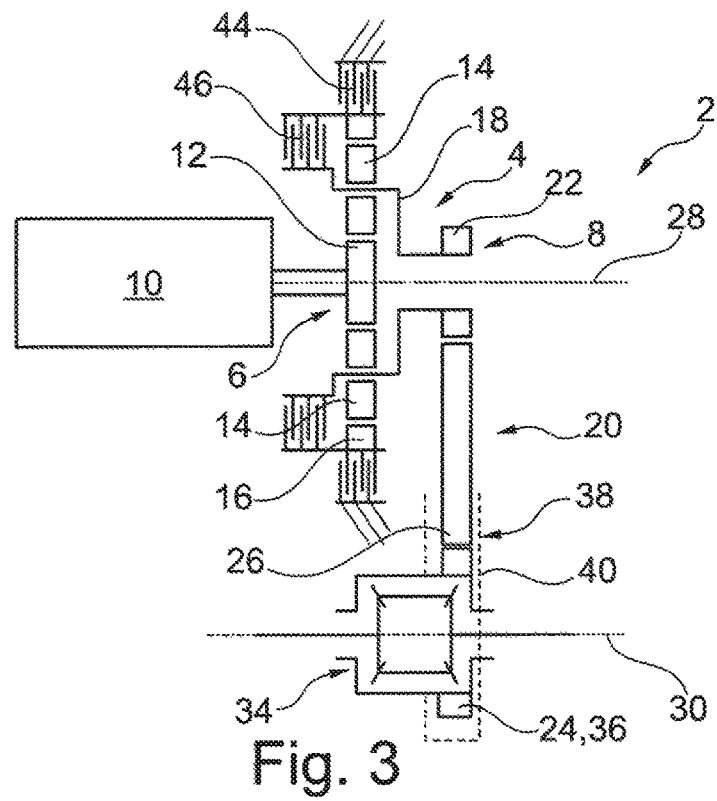
Figure 4:
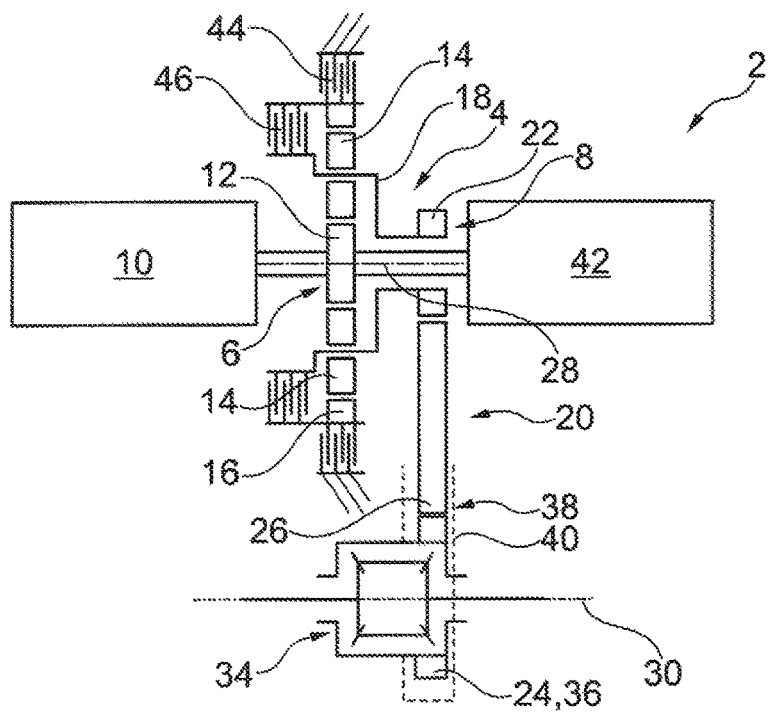
Figure 5:
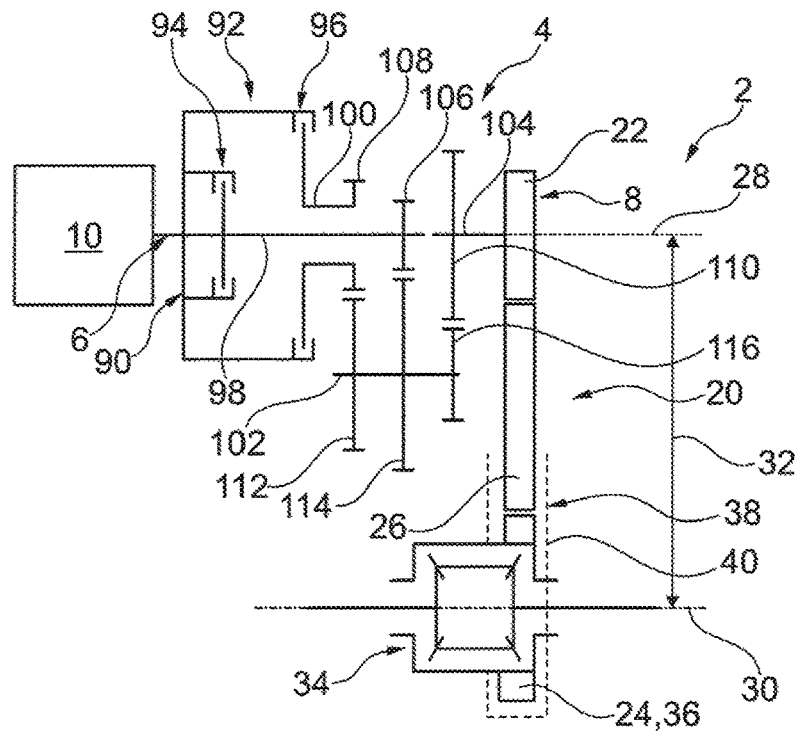
Figure 6:
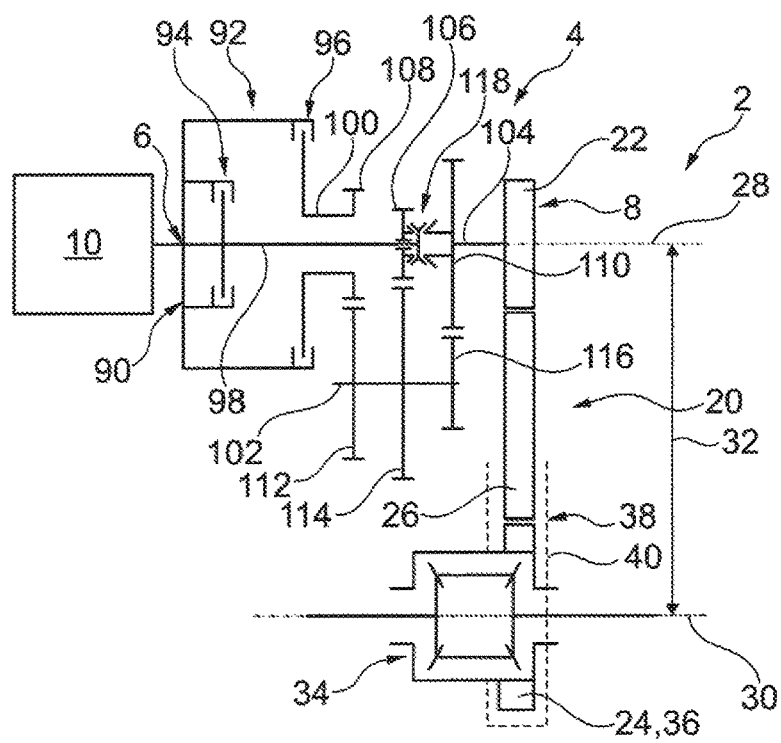
Figure 7:
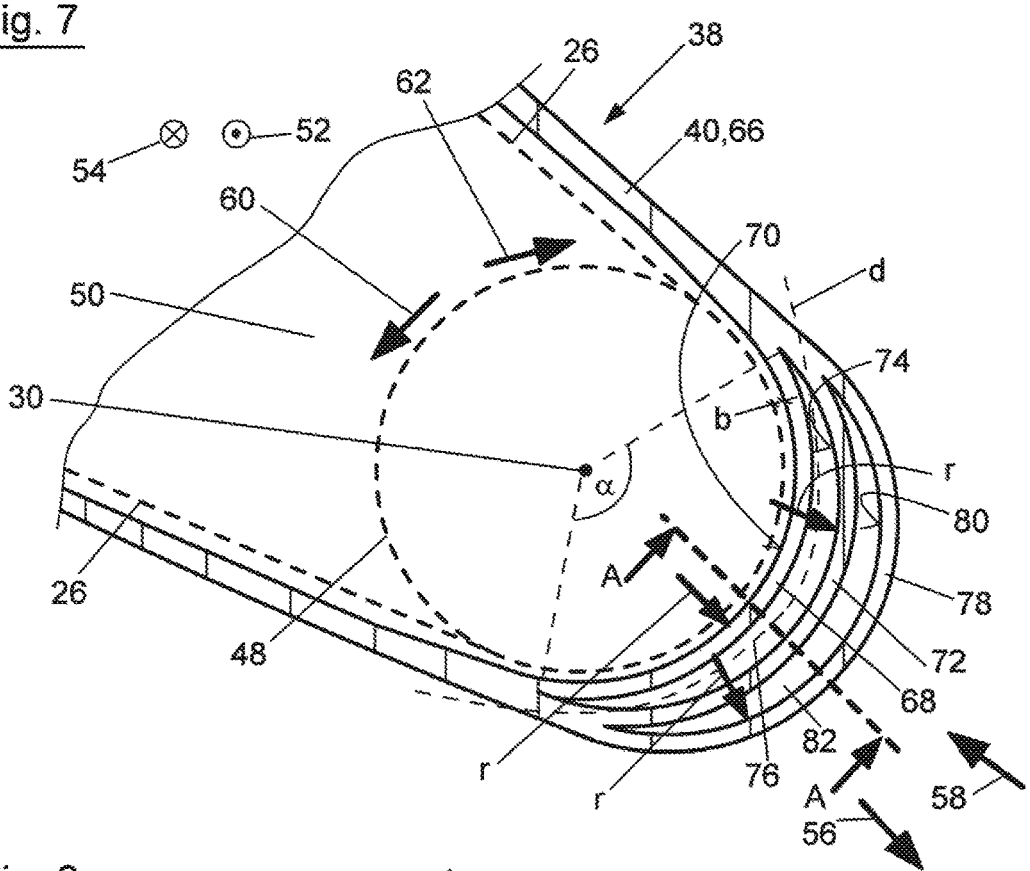
Figure 8:
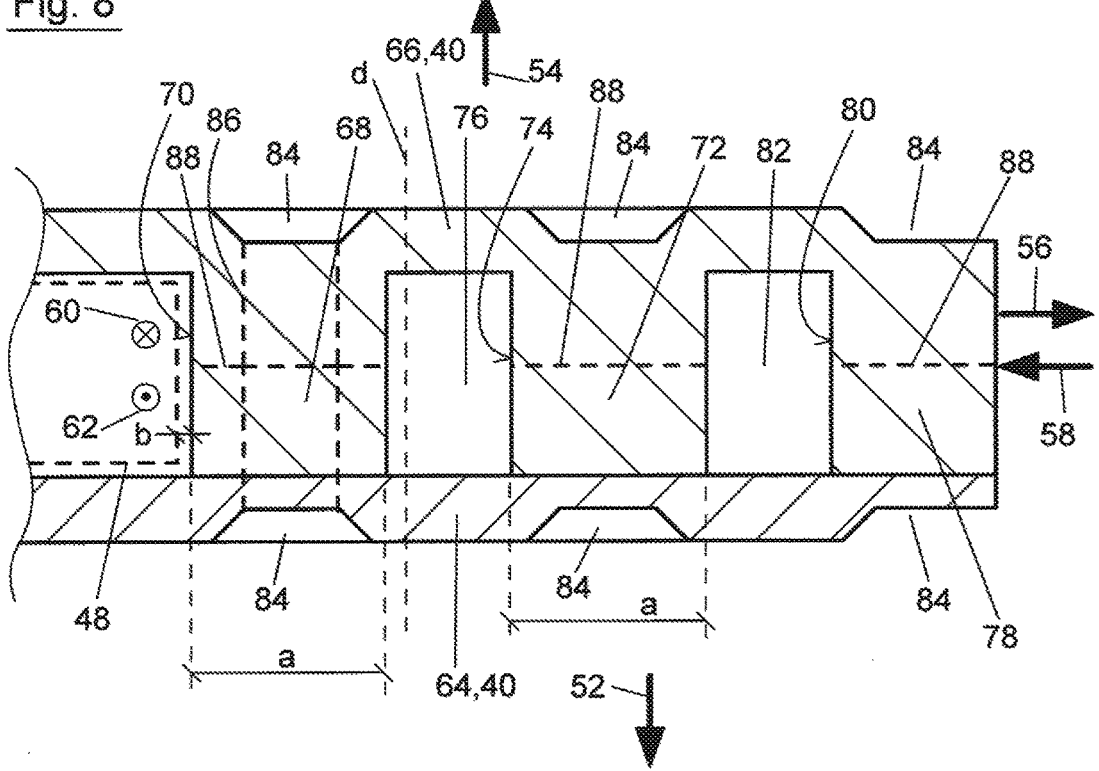
Figure 9:
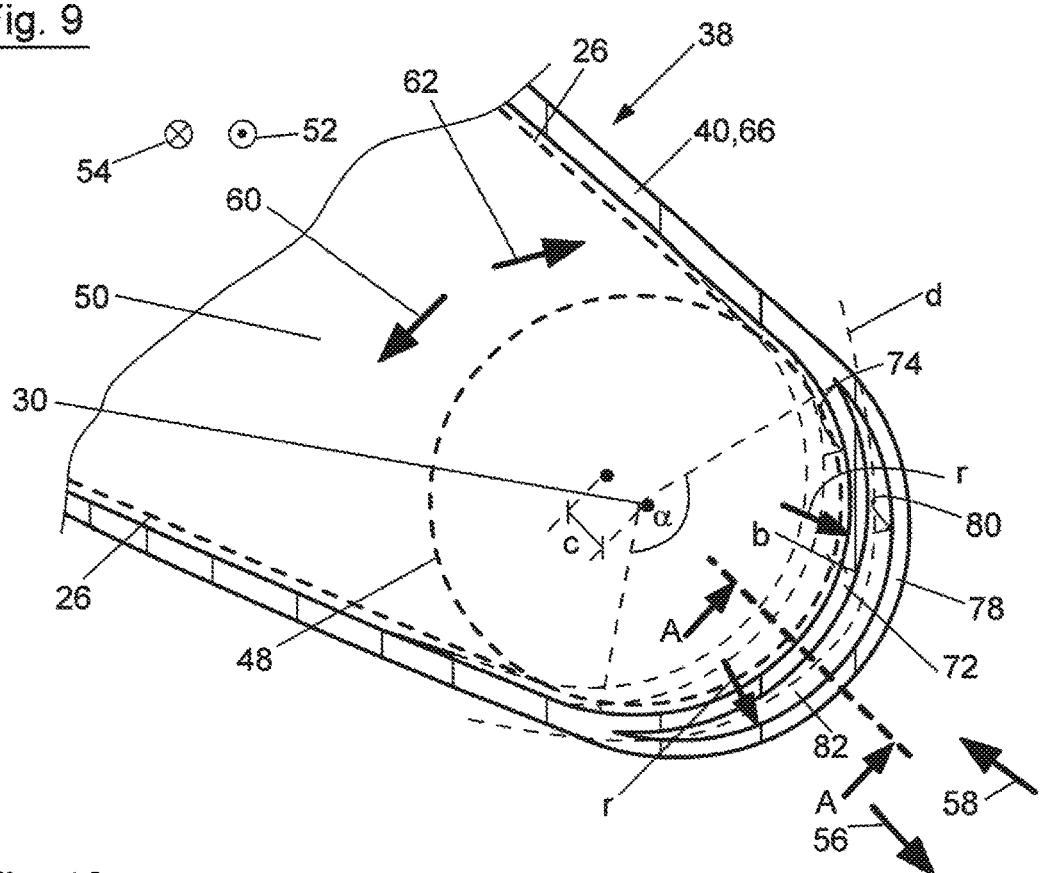
Figure 10:
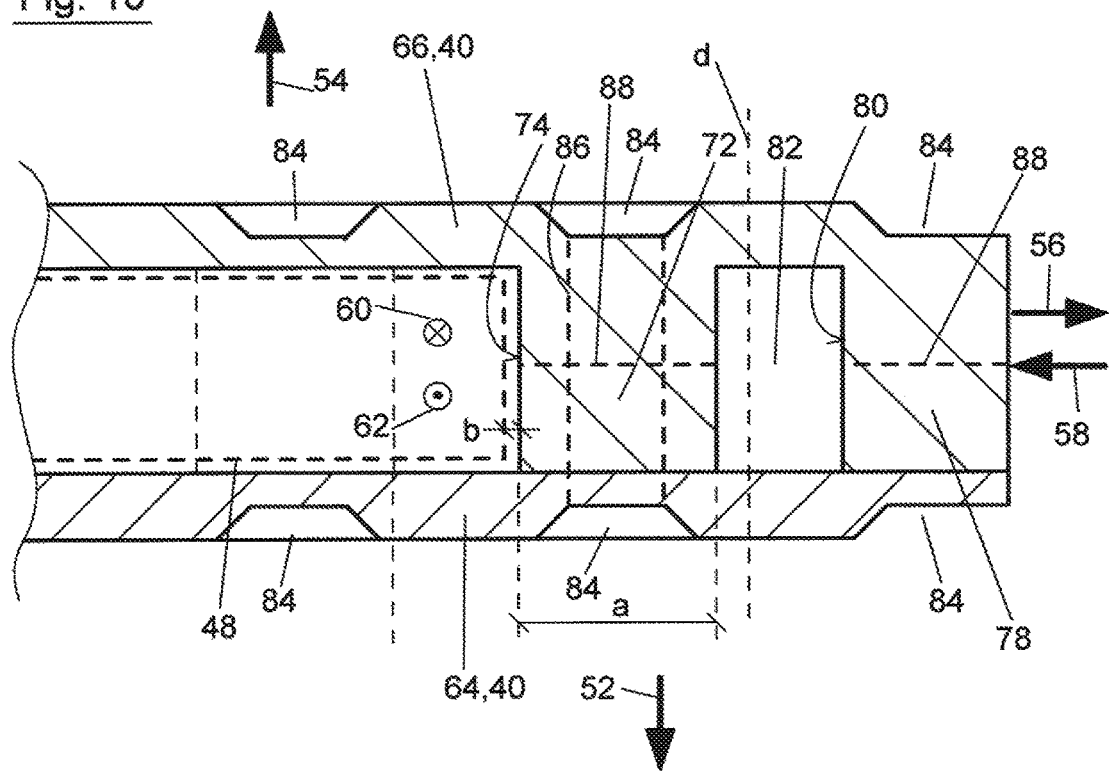
Figure 11:
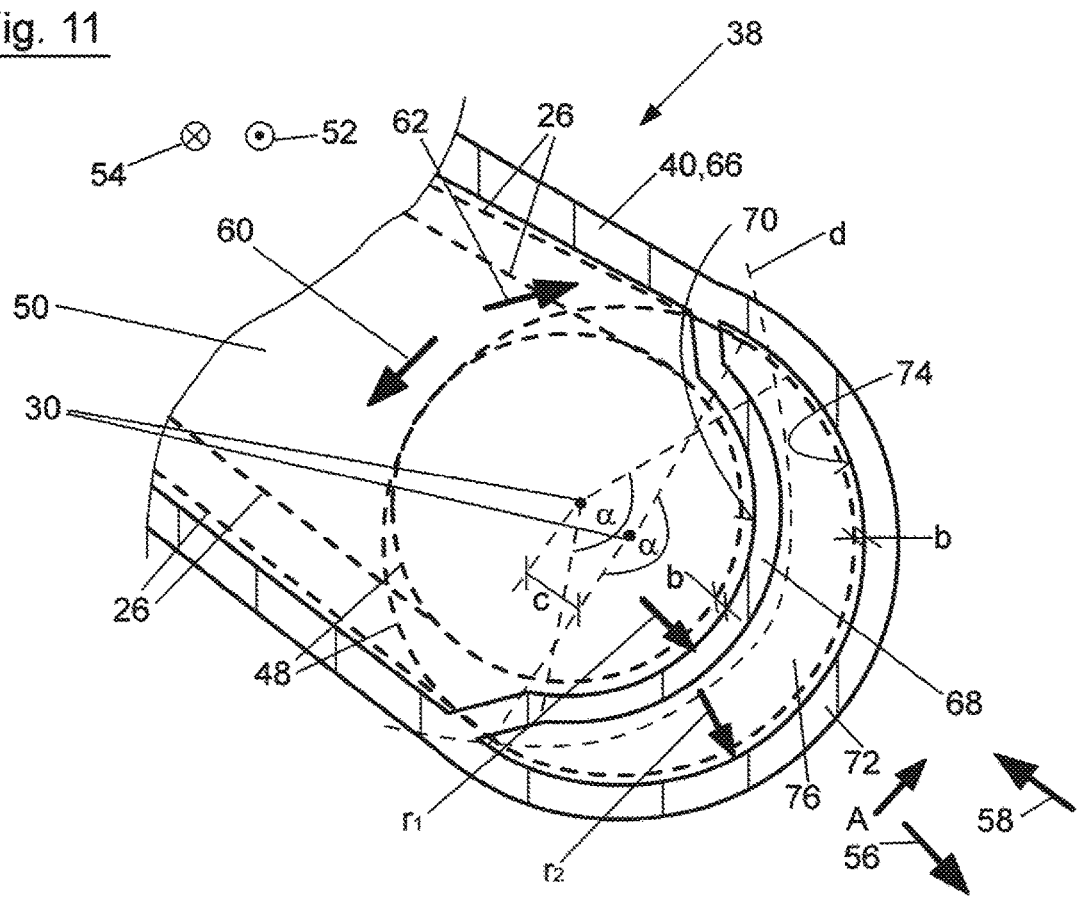

The invention is explained in greater detail below by means of illustrative embodiments with reference to the attached drawings, in which:

FIG. 1 shows a side view of a first embodiment of the transmission in schematic representation, FIG. 2 shows a side view of a second embodiment of the transmission in schematic representation, FIG. 3 shows a side view of a third embodiment of the transmission in schematic representation, FIG. 4 shows a side view of a fourth embodiment of the transmission in schematic representation, FIG. 5 shows a side view of a fifth embodiment of the transmission in schematic representation, FIG. 6 shows a side view of a sixth embodiment of the transmission in schematic representation, FIG. 7 shows a front view of a first embodiment of the transmission housing for use in a transmission as shown in one of FIGS. 1 to 6 in section, FIG. 8 shows a cross-sectional view along section line A-A in FIG. 7, FIG. 9 shows the transmission housing of FIG. 7 after the removal of the first wall, FIG. 10 shows a cross-sectional view along section line A-A in FIG. 9, and FIG. 11 shows a front view of a second embodiment of a transmission housing for use in a transmission as shown in one of FIGS. 1 to 6 in section.

FIG. 1 shows a transmission 2. The transmission 2 has a single-, two-, three- or multi-speed transmission section 4 having an input side 6 and an output side 8. The input side 6 is assigned to an electric motor 10, allowing the output torque of the electric motor 10 or the output rotation thereof to be transmitted to the input side 6 of the transmission section 4. In this embodiment, the transmission section 4 is designed as a planetary transmission and is made up essentially of a sun wheel 12, two or more planet wheels 14, which are in engagement with the sun wheel 12, and an annulus 16, which is in engagement with the planet wheels 14, wherein the planet wheels 14 are arranged on a planet carrier 18. In the embodiment shown, the sun wheel 12 acts as the input side 6, while the planet carrier 18 acts as the output side 8, while the annulus 16 is of fixed design. In this embodiment, the transmission section 4 is consequently designed as a single-speed transmission section 4 or one-speed transmission section 4.

The transmission 2 furthermore has a flexible drive 20, which is preferably designed as a chain drive. Thus, the flexible drive 20 has an input-side wheel 22, preferably a chain wheel, connected for conjoint rotation to the output side 8 of the transmission section 4, an output-side wheel 24, preferably a chain wheel, and a flexible drive means 26, preferably a chain, via which the input-side wheel 22 and the output-side wheel 24 are in rotary driving connection. The axis of rotation 28 of wheel 22 and the axis of rotation 30 of wheel 24 are also indicated in FIG. 1, said wheels being spaced apart in the vertical direction—in relation to the installed state of the transmission 2 within a motor vehicle or the like—with the result that wheel 22 is arranged above wheel 24, wherein a center distance 32 is shown in FIG. 1.

In addition, the transmission 2 has a differential 34, the input side 36 of which is formed by the output-side wheel 24 of the flexible drive 20 or is at least in rotary driving connection with the output-side wheel 24 of the flexible drive 20. Moreover, the two output shafts of the differential 34 are furthermore indicated in FIG. 1. The flexible drive 20 is arranged in a transmission housing 38, of which only a transmission section 40 is indicated in dashed lines in FIG. 1.

FIG. 2 shows a second embodiment of a transmission 2, which corresponds substantially to the first embodiment shown in FIG. 1, and therefore only the differences are explored below, identical reference signs are used for identical or similar parts and the above description otherwise applies accordingly.

In contrast to the first embodiment, the input side 6 of the transmission section 4 is assigned two electric motors 10 and 42 in the second embodiment, these both being connected to the input side 6 of the transmission section 4. The two electric motors 10, 42 are each designed in such a way that they can be operated in the low voltage range and/or are designed as low-voltage motors.

FIG. 3 shows a third embodiment of a transmission 2, which corresponds substantially to the first embodiment shown in FIG. 1, and therefore only the differences are explored below, identical reference signs are used for identical or similar parts and the above description otherwise applies accordingly.

In the third embodiment shown in FIG. 3, a clutch or brake 44 is provided between the annulus 16 and a fixed part of the transmission 2, said clutch or brake being selectively actuable. Moreover a clutch 46 is provided between the planet carrier 18 and the annulus 16, said clutch being selectively actuable, wherein the transmission section 4 in the form of the planetary transmission can revolve as a block when the clutch or brake 44 is open and clutch 46 is closed, the transmission ratio between the input side 6 and the output side 8 being 1:1 in this case. If, on the other hand, the clutch or brake 44 is closed while clutch 46 is open, the transmission ratio defined by the sun wheel 12 and the planet wheels 14 applies between the input side 6 and the output side 8. Consequently, this is a two- or multi-speed transmission section 4.

FIG. 4 shows a fourth embodiment of a transmission 2, wherein the fourth embodiment corresponds to a combination of the features of the second and third embodiments shown in FIGS. 2 and 3, i.e. in addition to the embodiment shown in FIG. 3, the additional electric motor 42 already described with reference to FIG. 2 is provided, this being an electric motor that can be operated in the low voltage range or a low-voltage motor—as in the case also of electric motor 10. In other respects, reference should be made to the preceding description of the embodiments shown in FIGS. 1 to 3 which apply in corresponding fashion to the embodiment shown in FIG. 4.

FIG. 5 shows a fifth embodiment of a transmission 2, which corresponds substantially to the third embodiment shown in FIG. 3, and therefore only the differences are explored below, identical reference signs are used for identical or similar parts and the above description otherwise applies accordingly.

The input side 6 of the transmission section 4, which is no longer designed as a planetary transmission in the fifth embodiment, is in rotary driving connection with the input side 90 of a dual clutch device 92. The dual clutch device 92 has a selectively actuable first clutch 94 and a selectively actuable second clutch 96, wherein the input side 90 can be brought into rotary driving connection with a first shaft 98 by means of the first clutch 94 and with a second shaft 100 by means of the second clutch 96. The two shafts 98, 100 are of coaxial design, wherein the first shaft 98 extends through the second shaft 100, which is designed as a hollow shaft. Moreover, the transmission section 4 has a third shaft 102, which is arranged parallel to the two shafts 98, 100, and a fourth shaft 104, wherein the fourth shaft 104 is arranged coaxially with the two shafts 98, 100 and is in rotary driving connection with the input-side wheel 22, which likewise forms the output side 8 of the transmission section 4. A gearwheel 106 is arranged for conjoint rotation on the first shaft 98, a gearwheel 108 is arranged for conjoint rotation on the second shaft 100, and a gearwheel 110 is arranged for conjoint rotation on the fourth shaft 104, wherein three gearwheels 112, 114 and 116 are arranged for conjoint rotation on the third shaft 102. In this case, gearwheel 106 is in rotary driving engagement with gearwheel 114, gearwheel 108 is in rotary driving engagement with gearwheel 112, and gearwheel 110 is in rotary driving engagement with gearwheel 116.

If the first clutch 94 is closed while the second clutch 96 is open, the transmission section 4 can be operated in a first gear, in which the torque can be transmitted from input side 6 to the output side 8 via input side 90, the first clutch 94, the first shaft 98, gearwheel 106, gearwheel 114, the third shaft 102, gearwheel 116, gearwheel 110 and the fourth shaft 104. If, on the other hand, the first clutch 94 is open, while the second clutch 96 is closed, the transmission section 4 can be operated in a second gear, in which the torque can be transmitted from input side 6 to the output side 8 via input side 90, the second clutch 96, the second shaft 100, gearwheel 108, gearwheel 112, the third shaft 102, gearwheel 116, gearwheel 110 and the fourth shaft 104. Consequently, this is a two-speed transmission section 4.

FIG. 6 shows a sixth embodiment of a transmission 2, which corresponds substantially to the fifth embodiment shown in FIG. 5, and therefore only the differences are explored below, identical reference signs are used for identical or similar parts and the above description otherwise applies accordingly.

In contrast to the embodiment shown in FIG. 5, gearwheel 106 is designed as a free pinion, which can thus be rotated relative to the first shaft 98. Moreover, a third clutch 118 is provided, by means of which the first shaft 98 can be brought into rotary driving connection either with gearwheel 106 or, via gearwheel 110, with the fourth shaft 104 or with neither of the two gearwheels 106, 110.

If the first clutch 94 is closed and the second clutch 96 is open, while the third clutch 118 brings the first shaft 98 into rotary driving connection with gearwheel 106, the transmission section 4 can be operated in a first gear, in which the torque can be transmitted from input side 6 to the output side 8 via input side 90, the first clutch 94, the first shaft 98, the third clutch 118, gearwheel 106, gearwheel 114, the third shaft 102, gearwheel 116, gearwheel 110 and the fourth shaft 104. If the second clutch 96 is closed, the transmission section 4 can be operated in a second gear, in which the torque can be transmitted from input side 6 to the output side 8 via input side 90, the second clutch 96, the second shaft 100, gearwheel 108, gearwheel 112, the third shaft 102, gearwheel 116, gearwheel 110 and the fourth shaft 104. In second gear, the first clutch 94 can be open or closed, although, when the first clutch 94 is closed, the third clutch must be transferred into a position in which it is in rotary driving connection neither with gearwheel 106 nor with gearwheel 110 or the fourth shaft 104. If the first clutch 94 is closed and the third clutch 118 has been transferred into a position in which said first shaft 98 is in rotary driving connection with gearwheel 110, the transmission section 4 can be operated in a third gear or direct gear, in which the torque can be transmitted from input side 6 to the output side 8 via input side 90, the first clutch 94, the first shaft 98, the third clutch 118, gearwheel 110 and the fourth shaft 104, wherein the second clutch 96 is open in the third gear. This is consequently a three-speed transmission section 4.

Even though the term transmission 2 has been used above in the case of all the embodiments described with reference to FIGS. 1 to 6, this is nevertheless—in combination with electric motor 10 and/or electric motor 42—a drive train for an electric vehicle or the like.

A first embodiment of a transmission housing 38 for use in a transmission 2 as shown in one of FIGS. 1 to 6 is described below with reference to FIGS. 7 to 19. Here, FIGS. 7 and 8 first of all show the initial form of the transmission housing 38.

As already indicated above, the transmission housing 38 has a housing section 40, which is shown in FIGS. 5 and 6. Provided in the housing section 40 is a substantially cylindrical accommodation space 48 for accommodating the output-side wheel 24 of the flexible drive 20, which is indicated in dashed lines in FIGS. 7 and 8 and forms part of the interior 50 enclosed by the transmission housing 38 or transmission section 40. In the figures, the mutually opposite axial directions 52, 54, the mutually opposite radial directions 56, 58 and the mutually opposite circumferential directions 60, 62 of the accommodation space 48 and of the output-side wheel 24 to be accommodated in the accommodation space 48 are indicated by corresponding arrows.

As can be seen from FIG. 8, the transmission housing 38 or transmission section 40 is made up essentially of a boundary wall 64 and of a boundary wall 66, which are arranged opposite one another in the axial direction 52, 54, wherein boundary wall 64 delimits the accommodation space 48 in axial direction 52 and boundary wall 66 delimits the accommodation space 48 in axial direction 54.

The housing section 40 furthermore has a first wall 68 with a curved first wall surface 70 facing the accommodation space 48, wherein the first wall surface 70 is curved in such a way that it is of concave design. In this case, the first wall surface 70 faces the accommodation space 48 in a radially inward direction 58. Moreover, the housing section 40 has a second wall 72, which is spaced apart in a radially outward direction 56 from the first wall 68 and has a curved second wall surface 74 facing the accommodation space 48 in a radially inward direction 58. Owing to the spacing between the first wall 68 and the second wall 72, a free space 76 is thus formed in the radial direction 56, 58 between the first wall 68 and the second wall 72. In addition, the housing section 40 has a third wall 78, which is spaced apart from the second wall 72 in a radially outward direction 56 and, for its part, has a curved third wall surface 80 facing the accommodation space 48 in the radially inward direction 58. In this case too, a free space 82 is once again formed in the radial direction 56, 58 between the second wall 72 and the third wall 78.

As can be seen especially from FIG. 7, the wall surfaces 70, 74 and 80 are each curved in the form of an arc, in this case in the form of a circular arc. At the same time, all the wall surfaces 70, 74, 80 have the same circular arc radius r in the illustrated embodiment according to FIGS. 5 to 8. Moreover, the first wall surface 70 has a wraparound angle α of at least 90°, preferably at least 120°, particularly preferably at least 140°, in relation to the accommodation space 48.

In the illustrated embodiment, the housing section 40 is designed as a casting or diecasting, wherein boundary wall 64 is formed by a first casting or diecasting and boundary wall 66 is formed by a second casting or diecasting, which are attached to one another in the axial direction 52, 54. In this case, the first wall 68, the second wall 72 and the third wall 78 are formed integrally with boundary wall 66, wherein the first wall 68 and the second wall 72 and, if appropriate, also the third wall 78 are each designed as a rib projecting in axial direction 52 on boundary wall 66. The rib thickness a of the first and second walls 68, 72 of rib-type design, i.e. the extent thereof in the radial direction 56, 58, said thickness being indicated especially in FIG. 6, is preferably at least 3 mm and/or at most 10 mm. In addition, at least one depression 84 is provided in each case in the region of the first wall 68, the second wall 72 and the third wall 78, both in the side of boundary wall 64 facing away from the accommodation space 48 and in axial direction 52 and in the side of boundary wall 66 facing away from the accommodation space 48 and in axial direction 54.

For a use in which the abovementioned center distance 32 is relatively short, the transmission housing 38 can simply be used in the form shown in FIGS. 7 and 8, wherein the output-side wheel 24 is arranged in the accommodation space 48 in such a way as to be rotatable about the axis of rotation 30 so as to be connected via the flexible drive means 26 to the input-side wheel 22 of the flexible drive 20, wherein the flexible drive means 26, which is likewise indicated in FIG. 5, extends through the interior 50 of the transmission housing 38. In this case, the outer circumference of the output-side wheel 24 together with the flexible drive means 26 is spaced apart from the first wall surface 70 of the first wall 68 in the radial direction 56, 58 by means of the clearance b in FIG. 7. In this case, the clearance b between the wheel 24 and the flexible drive means 26, on the one hand, and the first wall surface 70, on the other hand, in the circumferential direction 60, 62 is made substantially constant, especially since the curvature of the first wall surface 70 is matched to the outer circumference of the output-side wheel 24. During the operation of the transmission 2, an advantageous delivery of oil within the interior 50 in the direction of the input-side wheel 22 or of transmission section 4 is thereby generated when the output-side wheel 24 rotates about axis of rotation 30, in this case in a circumferential direction 60 for example.

However, the transmission housing 38 is furthermore also suitable for a use of a transmission 2 in which the center distance 32 is supposed to be larger. Thus—as indicated in FIGS. 9 and 10—the first wall 68 can simply be removed, thereby offsetting the accommodation space 48 or axis of rotation 30 of the output-side wheel 24 to be inserted into the accommodation space 48. Here, the removal of the first wall 68 can be achieved by a method involving removal or machining of material, e.g. by milling. Consequently, the accommodation space 48 is offset in radial direction 56 by removing the first wall 68, as shown by means of the offset c indicated in FIG. 7. The accommodation space 48 is now no longer bounded by the first wall surface 70 of the first wall 68 in radial direction 56, especially since said wall has been removed, but, on the contrary, is bounded by the second wall surface 74 of the second wall 72. Consequently, the output-side wheel 24 can now be inserted into the accommodation space 48 offset in radial direction 56, it being possible to achieve this while increasing the center distance 32 between the axis of rotation 28 of the input-side wheel 22 and the axis of rotation 30 of the output-side wheel 24 of the flexible drive 20. The second wall 74 too has a wraparound angle α of at least 90°, preferably at least 120°, particularly preferably at least 140°, in relation to the accommodation space 48, which is now offset in radial direction 56.

Although not shown once again in detail, the transmission housing 38 can also be used for a transmission 2 in which the center distance 32 is even larger than the center distance 32 shown in FIGS. 9 and 10. In this case, all that need be done is to remove the second wall 72 as well, thereby offsetting the accommodation space 48 in the radially outward direction 56. In other respects, the above explanations with reference to FIGS. 9 and 10 also apply in corresponding fashion to the removal of the second wall 72.

In addition, attention is drawn to the fact that, in relation to the modifications of the transmission housing 38 which are shown in FIGS. 7 and 8 or 9 and 10, the superfluous parts of the transmission housing 38 can be removed. Thus, in the case of FIGS. 7 and 8, the superfluous part can be cut off along parting line d in order to create a space-saving transmission housing 38. This applies in corresponding fashion to cutting off the part of the transmission housing 38 which is not required or is superfluous along the parting line d in FIGS. 9 and 10. Moreover, respective through holes 86 can be provided in the region of the depressions 84 in order to fasten the boundary walls 64, 66 to one another in the axial direction 52, 54, fastening being brought about by means of a screwed joint for example. The through holes 86 are indicated by way of example in FIGS. 8 and 10, wherein the depressions 84 significantly simplify the formation of the holes 86. It should furthermore be noted that, as a departure from FIGS. 8 and 10, the walls 68, 72, 78 can be formed integrally with boundary wall 66, on the one hand, and integrally with boundary wall 64, on the other hand, as indicated by means of the dashed line 88, which correspondingly separates two parts of said walls 68, 72, 78 from one another.

In another variant embodiment (not shown specifically) of the transmission housing 38 described above, at least the first wall 68 and the second wall 72 can be arranged detachably on the boundary walls 64, 66 in order to enable quick removal thereof when required. It would also be conceivable to provide only the first wall 68 and the third wall 78, that is to say to dispense with an intermediate wall 72, wherein the first wall 68 is arranged on the boundary walls 64, 66 in such a way that it can be offset in the radial direction 56, 58 in order to bring about offsetting of the accommodation space 48 by means of a corresponding offset of the first wall 68 in the radial direction 56, 58.

FIG. 11 shows a second embodiment of the transmission housing 38 for use in a transmission 2 according to one of FIGS. 1 to 6, wherein the transmission housing 38 in the second embodiment corresponds substantially to the transmission housing 38 according to the first embodiment in FIGS. 7 to 10, and therefore only the differences are explored below, identical reference signs are used for identical or similar parts and the above description otherwise applies accordingly.

As can be seen from FIG. 11, the transmission housing 38 in the second embodiment has only the first wall 68 and the second wall 72, while the third wall 78 or further walls have been omitted purely for reasons of clarity and better understanding. As can be seen from FIG. 11, however, the first wall surface 70, which is curved in the form of a circular arc, and the second wall surface 74, which is curved in the form of a circular arc, have different circular arc radii $r_1$ and $r_2$, where $r_2$ is larger than $r_1$ in the embodiment shown. The result is that not only is a larger center distance 32 between the input-side wheel 22 and the output-side wheel 24 of the flexible drive 20 possible by offsetting the accommodation space 48 in the radially outward direction 56 by removing the first wall 68, but removing the first wall 68 also involves increasing the radius or diameter of the accommodation space 48, thereby also making it possible to insert a correspondingly larger output-side wheel 24 into the now enlarged accommodation space 48 in order to change the transmission ratio between the input-side wheel 22 and the output-side wheel 24 of the flexible drive 20. In other respects, reference may be made to the above explanations relating to the transmission housing 38 according to FIGS. 7 to 10, which apply in corresponding fashion to this second embodiment.

LIST OF REFERENCE SIGNS 2 transmission
4 transmission section
6 input side
8 output side
10 electric motor
12 sun wheel
14 planet wheels
16 annulus
18 planet carrier
20 flexible drive
22 input-side wheel
24 output-side wheel
26 flexible drive means
28 axis of rotation
30 axis of rotation
32 center distance
34 differential
36 input side
38 transmission housing 40 transmission section
42 electric motor
44 clutch or brake
46 clutch
48 accommodation space
50 interior
52 axial direction
54 axial direction
56 radial direction
58 radial direction
60 circumferential direction
62 circumferential direction
64 boundary wall
66 boundary wall
68 first wall
70 first wall surface
72 second wall
74 second wall surface
76 free space
78 third wall
80 third wall surface
82 free space
84 depression
86 hole
88 parting line
90 input side
92 dual clutch device
94 first clutch
96 second clutch
98 first shaft
100 second shaft
102 third shaft
104 fourth shaft
106-116 gearwheels
118 third clutch
α wraparound angle
a rib thickness
b clearance
c offset
d parting line
r circular arc radius
$r_1$ circular arc radius
$r_2$ circular arc radius

The invention claimed is:

1. A transmission housing for a transmission with a flexible drive having a housing section comprising a first boundary wall and a second boundary wall, opposite of the first boundary wall in an axial direction, wherein the first boundary wall and the second boundary wall define an accommodation space for a wheel of the flexible drive, and wherein the housing section further comprises at least one curved wall surface, wherein the wall surface is constructed and arranged to change in a radial direction, thereby offsetting and/or enlarging the accommodation space.

2. The transmission housing as claimed in claim 1, in which the housing section has a first wall with a curved first wall surface facing the accommodation space and a second wall, which is spaced apart in a radially outward direction from the first wall and has a curved second wall surface facing the accommodation space.

3. The transmission housing as claimed in claim 1, in which at least one of the wall surfaces is curved in the form of an arc.

4. The transmission housing as claimed in claim 1, in which at least one of the wall surfaces has a wraparound angle of at least 90° in relation to the accommodation space.

5. A transmission for an electric vehicle having a single-, two-, three- or multi-speed planetary transmission section, which has an input side operatively attached to and driven by at least one electric motor and an output side, which is in rotary driving connection with a wheel of a flexible drive via a flexible drive means of the flexible drive; the flexible drive having a housing section comprising a first boundary wall and a second boundary wall, opposite of the first boundary wall in an axial direction; wherein the first boundary wall and the second boundary wall define an accommodation space for a wheel of the flexible drive, and wherein the housing section further comprises at least one curved wall surface, wherein the wall surface is constructed and arranged to change in a radial direction, thereby offsetting and/or enlarging the accommodation space.

6. The transmission as claimed in claim 5, in which the input side of the transmission section is formed by a sun wheel or annulus of the planetary transmission and/or the output side of the transmission section is formed by a planet carrier of the planetary transmission.

7. The transmission as claimed in claim 5, in which at least one selectively actuable clutch and/or brake is provided for shifting the transmission section, wherein two or more selectively actuable clutches and/or brakes are provided for shifting the transmission section.

8. The transmission as claimed in claim 5, in which the input side is assigned two electric motors, wherein the two electric motors at least one of operate in a low voltage range or are low-voltage motors.

9. The transmission as claimed in claim 5, which furthermore has a differential, the input side of which is preferably formed by the wheel.

10. A method for producing transmissions, comprising the following method steps:
producing a quantity of transmission housings
and
producing first transmissions from a first partial quantity of the transmission housings by arranging the wheel of a flexible drive within the accommodation space and/or
producing second transmissions from a second partial quantity of the transmission housings by removing or offsetting the first wall.

11. A transmission housing for a transmission with a flexible drive having a housing section with at least one curved wall surface facing an accommodation space for a wheel of the flexible drive, wherein the wall surface is constructed and arranged to change in a radial direction, thereby offsetting and/or enlarging the accommodation space;
wherein the housing section has a first wall with a curved first wall surface facing the accommodation space and a second wall, which is spaced apart in a radially outward direction from the first wall and has a curved second wall surface facing the accommodation space; and
wherein the housing section furthermore has a third wall, which is spaced apart in a radially outward direction from the second wall and has a curved third wall surface facing the accommodation space, wherein the first and second walls are removable, thereby offsetting and/or enlarging the accommodation space.

12. The transmission housing as claimed in claim 11, in which the housing section is designed as a casting or a diecasting, wherein the first wall and the second wall are designed as a projecting rib.

13. The transmission housing as claimed in claim 11, in which the housing section has at least one boundary wall delimiting the accommodation space in an axial direction, wherein the first wall and the second and/or third wall are at least of a partially integral design with the boundary wall, wherein at least one depression is provided in that side of the boundary wall which faces away from the accommodation space in the region of the first wall and also in the region of the second and/or third wall.

\* \* \* \* \*